: US009446722B2

United States Patent
Morris et al.

(10) Patent No.: US 9,446,722 B2
(45) Date of Patent: Sep. 20, 2016

(54) ELASTIC AVERAGING ALIGNMENT MEMBER

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 14/134,622

(22) Filed: Dec. 19, 2013

(65) Prior Publication Data

US 2015/0175091 A1  Jun. 25, 2015

(51) Int. Cl.
B60R 13/02 (2006.01)
F16B 19/02 (2006.01)

(52) U.S. Cl.
CPC ........... B60R 13/0206 (2013.01); F16B 19/02 (2013.01); *Y10T 29/49876* (2015.01); *Y10T 403/75* (2015.01)

(58) Field of Classification Search
CPC ..... B60R 13/04; B60R 13/0206; F16B 5/02; F16B 29/00; F16B 19/02; Y10T 29/49876; Y10T 403/75
See application file for complete search history.

(56) References Cited

U.S. PATENT DOCUMENTS

| 419,358 A | 1/1890 | Raymond |
|---|---|---|
| 1,219,398 A | 3/1917 | Huntsman |
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |

(Continued)

FOREIGN PATENT DOCUMENTS

| CN | 1036250 A | 10/1989 |
|---|---|---|
| CN | 1129162 A | 8/1996 |

(Continued)

OTHER PUBLICATIONS

"Elastic Averaging in Flexture Mechanisms: A Multi-Beam Paralleaogram Flexture Case-Study" by Shorya Awtar and EDIP SEVINCER, Proceedings of IDETC/CIE 2006, Paper DETC2006-99752, American Society of Mechanical Engineers (ASME), Sep. 2006.

(Continued)

*Primary Examiner* — Glenn Dayoan
*Assistant Examiner* — Melissa A Black
(74) *Attorney, Agent, or Firm* — Cantor Colburn LLP

(57) ABSTRACT

An elastic averaging alignment member includes a base portion, a first elastic averaging member including a first end portion extending substantially perpendicularly from the base portion to a second end portion and a second elastic averaging member spaced from the first elastic averaging member. The second elastic averaging member includes a first end section extending substantially perpendicularly from the base portion to a second end section. At least one elastic averaging element arranged between the first and second elastic averaging members. At least one of the first and second elastic averaging members and the at least one elastic averaging element is configured and disposed to deform when the elastic averaging alignment member is passed into an alignment member receiver to establish an elastically average position of one component to another component.

20 Claims, 5 Drawing Sheets

(56) References Cited

U.S. PATENT DOCUMENTS

| | | |
|---|---|---|
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,406,033 A | 9/1983 | Chisholm et al. |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,339,491 A | 8/1994 | Sims |
| 5,342,139 A | 8/1994 | Hoffman |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,920,200 A | 7/1999 | Pendse |
| 5,929,382 A | 7/1999 | Moore |
| 5,934,729 A | 8/1999 | Baack |

(56) References Cited

U.S. PATENT DOCUMENTS

| | | |
|---|---|---|
| 5,941,673 A | 8/1999 | Hayakawa et al. |
| 5,988,678 A | 11/1999 | Nakamura |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,289,560 B1 | 9/2001 | Guyot |
| 6,299,478 B1 | 10/2001 | Jones et al. |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 * | 10/2012 | Kwolek .................. 296/1.08 |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 * | 4/2013 | Kwolek .................. 296/24.34 |
| 8,444,199 B2 | 5/2013 | Takeuchi et al. |
| 8,572,818 B2 | 11/2013 | Hofmann |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |

(56) References Cited

U.S. PATENT DOCUMENTS

| | | |
|---|---|---|
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Shoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |

(56) References Cited

U.S. PATENT DOCUMENTS

| | | | |
|---|---|---|---|
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093178 A1 | 4/2015 | Morris |
| 2015/0093179 A1 | 4/2015 | Morris et al. |
| 2015/0115656 A1 | 4/2015 | Lungershausen |
| 2015/0135509 A1 | 5/2015 | Morris et al. |
| 2015/0165609 A1 | 6/2015 | Morris et al. |
| 2015/0165985 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | | |
|---|---|---|---|
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 1961157 A | 5/2007 |
| CN | 2915389 Y | 6/2007 |
| CN | 200941716 Y | 8/2007 |
| CN | 101250964 A | 8/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 A | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202079532 U | 12/2011 |
| CN | 102313952 A | 1/2012 |
| CN | 202132326 U | 2/2012 |
| CN | 102756633 A | 10/2012 |
| CN | 102803753 A | 11/2012 |
| CN | 202561269 U | 11/2012 |
| CN | 102869891 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 203189459 U | 9/2013 |
| DE | 1220673 B | 7/1966 |
| DE | 2736012 A1 | 2/1978 |
| DE | 3711696 A1 | 10/1988 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2003158387 A | 5/2003 |
| JP | 2003314515 A | 11/2003 |
| JP | 2005268004 | 9/2005 |
| JP | 2006205918 A | 8/2006 |
| JP | 2008307938 A | 12/2008 |
| JP | 2009084844 A | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 A1 | 3/2011 |

(56) References Cited

FOREIGN PATENT DOCUMENTS

| WO | 2013088447 A1 | 6/2013 |
| WO | 2013191622 A1 | 12/2013 |

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

Chinese Office Action for Application No. 2014107920391; dated Mar. 31, 2016; 8 pgs.

Rojas, F.E., et al., "Kinematic Coupling for Precision Fixturing & Assembly" MIT Precision Engineering Research Group, Apr. 2013.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013.

Willoughby, P., "Elastically Averaged Precision Alignment", B.S. Mechanical Engineering University of Pittsburgh, 2000.

\* cited by examiner

ELASTIC AVERAGING ALIGNMENT MEMBER

FIELD OF THE INVENTION

The subject invention relates to fastening devices and, more particularly, to an elastic averaging alignment member.

BACKGROUND

Currently, components which are to be mated together in a manufacturing process are mutually located with respect to each other by 2-way and/or 4-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, there can occur significant positional variation as between the mated first and second components which may contribute to the presence of undesirably large and varying gaps and otherwise poor fit. Additional undesirable effects including squeaking, rattling and overall poor quality perception based on relative motion of the mated components.

SUMMARY OF THE INVENTION

In accordance with an exemplary embodiment, an elastic averaging alignment member includes a base portion, a first elastic averaging member including a first end portion extending substantially perpendicularly from the base portion to a second end portion and a second elastic averaging member spaced from the first elastic averaging member. The second elastic averaging member includes a first end section extending substantially perpendicularly from the base portion to a second end section. At least one elastic averaging element is arranged between the first and second elastic averaging members. At least one of the first and second elastic averaging members and the at least one elastic averaging element is configured and disposed to deform when the elastic averaging alignment member is passed into an alignment member receiver to establish an elastically average position of one component to another component.

In accordance with another exemplary embodiment, a method of aligning a first substrate to a second substrate with an elastic averaging alignment member includes positioning a first substrate including a plurality of elastic averaging alignment members each having at least two elastic averaging members joined by at least one elastic averaging element relative to a second substrate including a plurality of alignment member receivers, establishing an initial alignment of the plurality of elastic averaging alignment members with respective ones of the alignment member receivers, inserting the at least two elastic averaging members into respective one of the alignment member receivers, and deforming at least one of the at least two elastic averaging members and the at least one elastic averaging element of each of the elastic averaging alignment members to establish a desired final alignment of the first substrate relative to the second substrate.

In yet another exemplary embodiment of the invention, a motor vehicle includes a body having a trim component receiving zone provided with a plurality of alignment member receivers, and a trim component having a base portion provided with a plurality of elastic averaging alignment members. Each of the elastic averaging alignment members include a first elastic averaging member including a first end portion extending substantially perpendicularly from the trim component to a second end portion and a second elastic averaging member spaced from the first elastic averaging member. The second elastic averaging member includes a first end section extending substantially perpendicularly from the trim component to a second end section. At least one elastic averaging element is arranged between the first and second elastic averaging members. At least one of the first and second elastic averaging members and the at least one elastic averaging element is configured and disposed to deform when each of the plurality of elastic averaging alignment members is passed into a corresponding one of the plurality of alignment member receivers to establish an elastically averaged position of the trim component relative to the body.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

Figure 1:
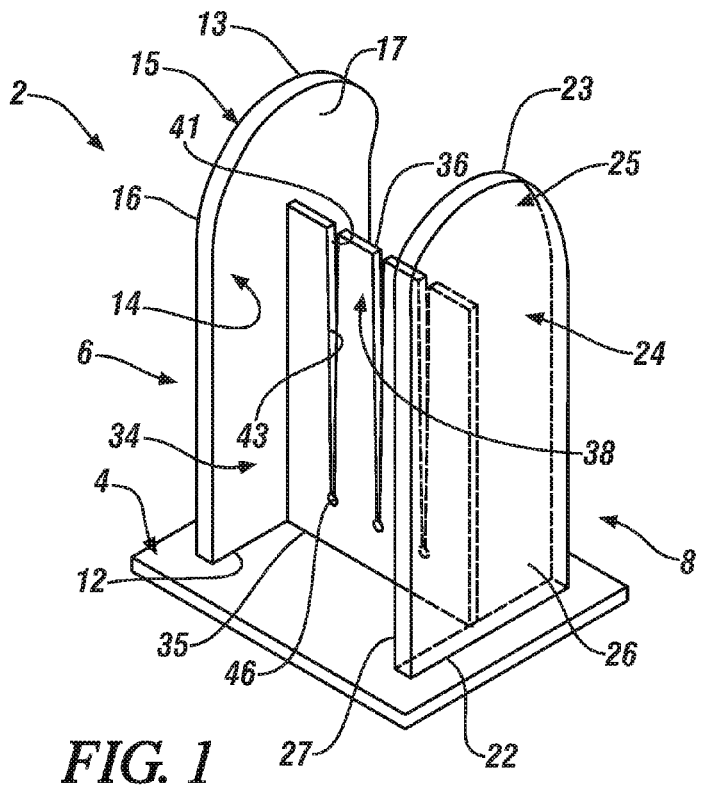
FIG. 1 is a perspective view of an elastic averaging alignment member having a plurality of elastic averaging elements in accordance with an exemplary embodiment.

The following description is merely exemplary in nature and is not intended to limit the present disclosure, its

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

An elastic averaging alignment member in accordance with an exemplary embodiment is indicated generally at 2 in FIG. 1. As used herein, elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. Patent Application No. 2013/0019455, the disclosure of which is incorporated by reference herein in its entirety. The embodiments disclosed herein provide the ability to convert an existing component that is not compatible with the described elastic averaging principles to an assembly that does facilitate elastic averaging and the benefits associated therewith.

Any suitable elastically deformable material may be used. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic. The predetermined elastic response characteristic may include, for example, a predetermined elastic modulus.

Elastic averaging alignment member 2 includes a base portion 4 that supports a first elastic averaging member 6 and a second elastic averaging member 8. First elastic averaging member 6 extends from a first end portion 12 to a second end portion 13 through an intermediate portion 14. Second end portion 13 includes a lead-in angle section 15. First elastic averaging member 6 extends substantially perpendicularly from base portion 4 and includes a first or exterior surface 16 and an opposing second or interior surface 17. Similarly, second elastic averaging member 8 extends from a first end portion 22 to a second end portion 23 through an intermediate portion 24. Second end portion 23 includes a lead-in angle section 25. Lead-in angle sections 15 and 25 facilitate insertion of elastic averaging alignment member 2 into an alignment member receiver as will be detailed more fully below. Second elastic averaging member 8 extends substantially perpendicularly from base portion 4 and is spaced from, and generally parallel to, first elastic averaging member 6. Second elastic averaging member 8 includes a first or exterior surface 26 and a second or interior surface 27.

In accordance with an exemplary embodiment, a web 34 extends between interior surface 17 of first elastic averaging member 6 and interior surface 27 of second elastic averaging member 8. Web 34 includes a first end 35 and a second end 36. In the exemplary embodiment shown, first end 35 is joined with base portion 4. However, it should be understood that first end 35 may also be spaced from base portion 4. Web 34 includes a plurality of elastic averaging elements, one of which is indicated at 38. Elastic averaging elements 38 are defined by a plurality of openings or gaps 41 that extend from second end 36 toward first end 35. In accordance with the exemplary aspect shown, openings 41 take the form of V-shaped notches 43 that terminate in a strain relief section 46. However it is understood that the notches could be shapes other than V-shaped and could, for example, be U-shaped. Strain relief section 46 substantially prevents openings 41 from extending completely through web 34 to first end 35.

Figure 2:
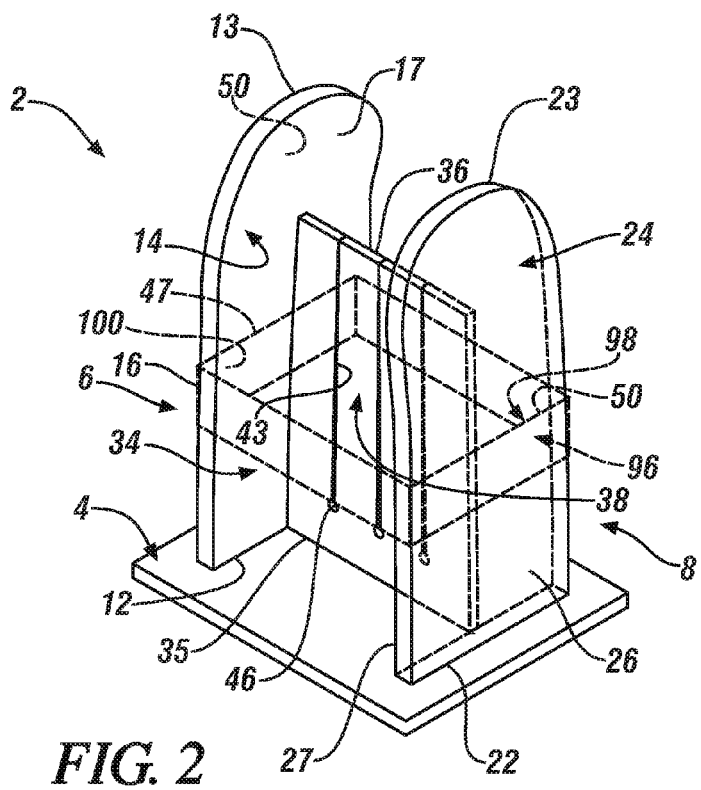
FIG. 2 is a perspective view of the elastic averaging alignment member of FIG. 1 illustrating the plurality of elastic averaging elements in a compressed configuration.
Figure 3:
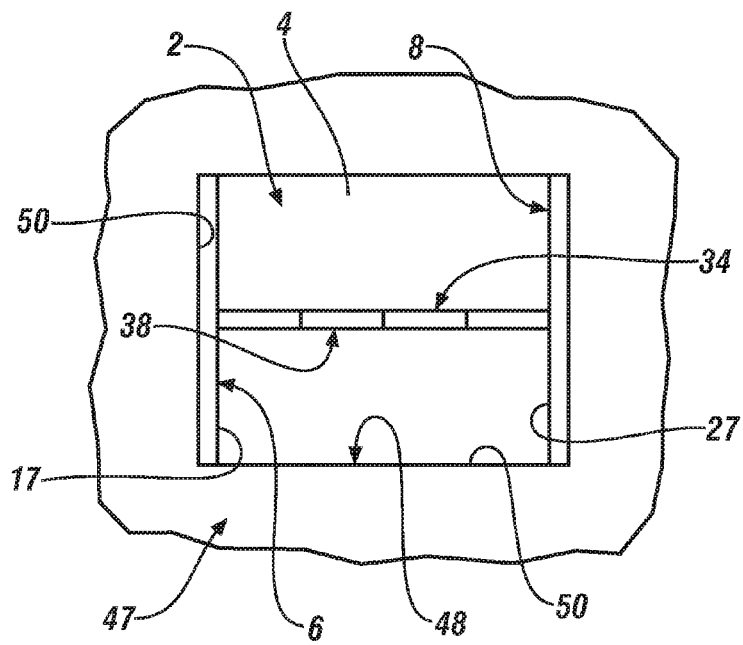
FIG. 3 is a plan view of the elastic averaging alignment member of FIG. 1 engaged with an alignment member receiver.

As shown in FIGS. 2 and 3, when elastic averaging alignment member 2 is placed within an alignment member receiver 47, elastic averaging elements 38 are compressed. More specifically, alignment member receiver 47 takes the form of an opening 48 defined by a plurality of edge or side portions 50, which are indicated in FIG. 3. Two opposing side portions 50 interact with first and second elastic averaging members 6 and 8 causing elastic averaging elements 38 to come together. At this point, elastic averaging elements 38 exert an outward force on first and second elastic averaging members 6 and 8 causing an inter-engagement of elastic averaging alignment member 2 and alignment member receiver 47. In addition to an elastic deformation in elastic averaging element 38, first and second elastic averaging members 6 and 8 may also elastically deform to contribute to establishing an elastically averaged position of one component to another component. More specifically, the compression of elastic averaging element 38 and/or first and second elastic averaging members 6 and 8, when combined with compression of elastic averaging elements and/or members associated with additional elastic averaging alignment members, allows for components to be aligned or positioned. More specifically, each elastic averaging element and/or elastic averaging member may compress differently and also allow for further manipulation so that components that may be misaligned without elastic averaging, may now be aligned to one another to establish a desired fit and finish.

Figure 4:
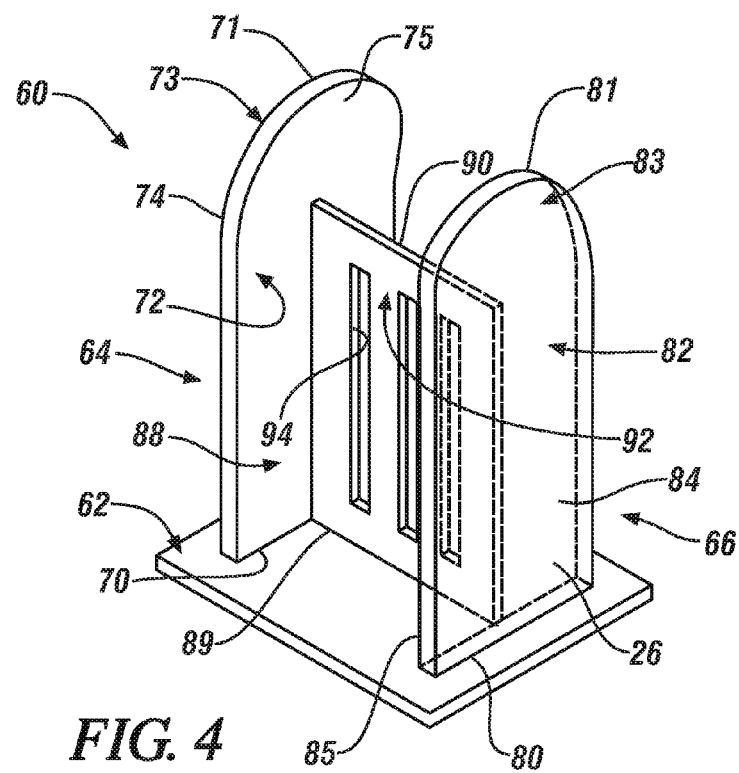
FIG. 4 is a perspective view of an elastic averaging alignment member in accordance with another aspect of the exemplary embodiment.
Figure 5:
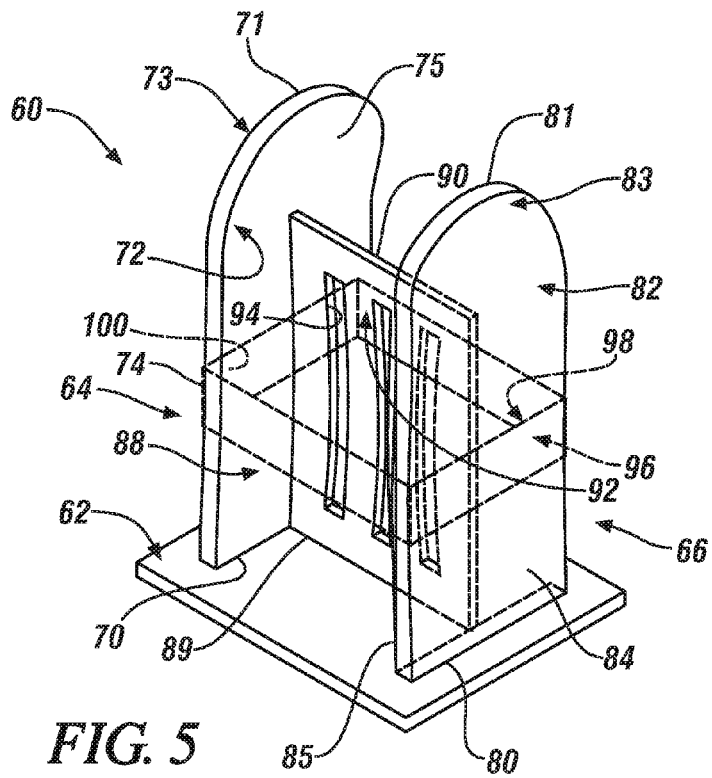
FIG. 5 is a perspective view of the elastic averaging alignment member of FIG. 4 engaged with an alignment member receiver.

Reference will now follow to FIGS. 4 and 5 in describing an elastic averaging alignment member 60 in accordance with another aspect of the exemplary embodiment. Elastic averaging alignment member 60 includes a base portion 62 that supports a first elastic averaging member 64 and a second elastic averaging member 66. First elastic averaging member 64 extends from a first end portion 70 to a second end portion 71 through an intermediate portion 72. Second end portion 71 includes a lead-in angle section 73. First elastic averaging member 64 extends substantially perpendicularly from base portion 62 and includes a first or exterior surface 74 and an opposing second or interior surface 75. Similarly, second elastic averaging member 66 extends from a first end portion 80 to a second end portion 81 through an intermediate portion 82. Second end portion 81 includes a lead-in angle section 83. Lead-in angle sections 73 and 83 facilitate insertion of elastic averaging alignment member 60 into a mating component. Second elastic averaging member 66 extends substantially perpendicularly from base portion 62 and is spaced from, and generally parallel to, first elastic averaging member 64. Second elastic averaging member 66 includes a first or exterior surface 84 and a second or interior surface 85.

In accordance with the exemplary aspect shown, a web 88 extends between interior surface 75 of first elastic averaging member 64 and interior surface 85 of second elastic averaging member 66. Web 88 includes a first end 89 and a second end 90. In the exemplary embodiment shown, first end 89 is joined with base portion 62. However, it should be understood that first end 89 may also be spaced from base portion 62. Web 88 includes a plurality of elastic averaging elements, one of which is indicated at 92. Elastic averaging elements 92 are defined by a plurality of openings 94 that extend along web 88 between first end 89 and second end 90. In accordance with the exemplary aspect shown, openings 94 include a generally rectangular shape.

When elastic averaging alignment member 60 is placed within an alignment member receiver 96, openings 94 facilitate a bending moment of elastic averaging elements 92. More specifically, alignment member receiver 96 takes the form of an opening 98 defined by a plurality of edge or side portions, one of which is indicated at 100. Two opposing side portions 100 interact with first and second elastic averaging members 64 and 66 causing web 88 to compress inward. At this point, web 88 exerts an outward force on first and second elastic averaging members 64 and 66 causing an inter-engagement of elastic averaging alignment member 60 and alignment member receiver 96. First and second elastic averaging members 64 and 66 may also elastically deform. The compression of web 88 and/or elastic averaging members 64 and 66, when combined with compression/bending/deflection of webs and/or elastic averaging members associated with additional elastic averaging alignment members, allows for components to be aligned with much better precision. More specifically, each elastic averaging element may compress/bend/deflect differently and also allow for further manipulation so that components that may have poor alignment and fit prior to elastic averaging may now be aligned to establish a desired fit and finish.

Figure 6:
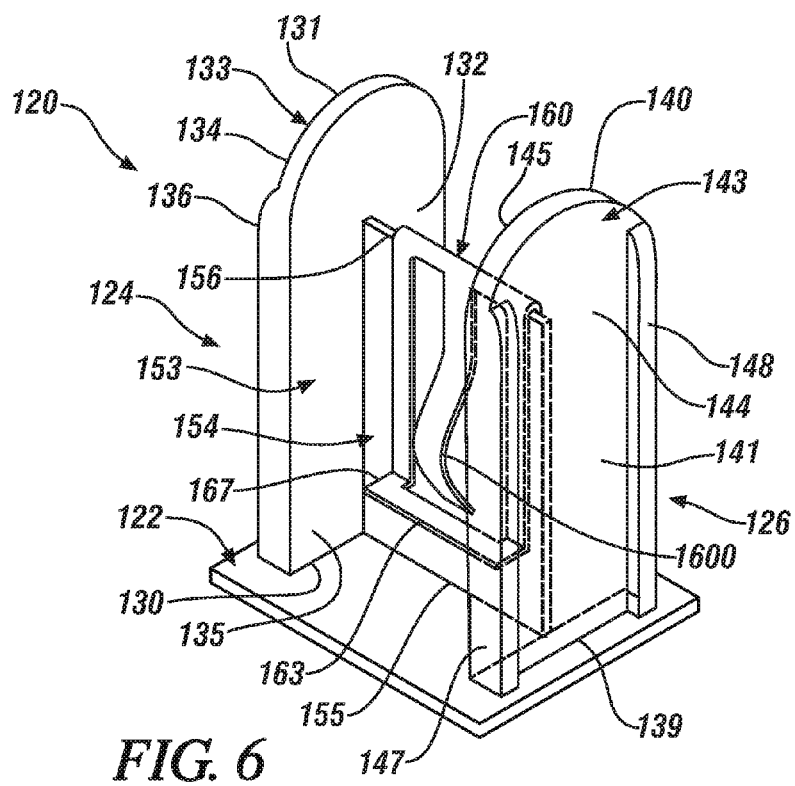
FIG. 6 is a perspective view of an elastic averaging alignment member in accordance with another aspect of the exemplary embodiment.
Figure 7:
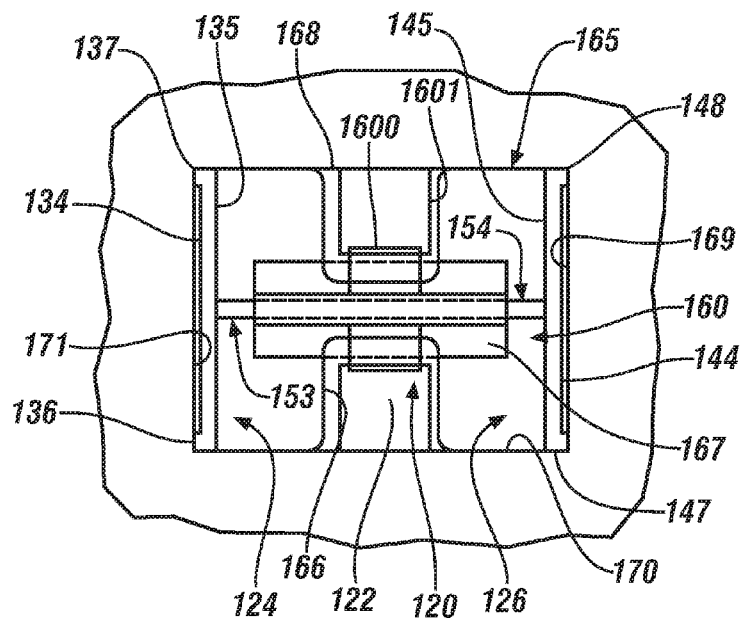
FIG. 7 is a plan view of the elastic averaging alignment member of FIG. 6 entering into an alignment member receiver.

Reference will now follow to FIGS. 6 and 7 in describing an elastic averaging alignment member 120 in accordance with another aspect of the exemplary embodiment. Elastic averaging alignment member 120 includes a base portion 122 that supports a first elastic averaging member 124 and a second elastic averaging member 126. First elastic averaging member 124 extends from a first end portion 130 to a second end portion 131 through an intermediate portion 132. Second end portion 131 includes a distal section 133. First elastic averaging member 124 extends substantially perpendicularly from base portion 122 and includes a first or exterior surface 134 and an opposing second or interior surface 135. Exterior surface 134 includes a first rib 136 and a second rib 137. First and second ribs 136 and 137 taper inwardly from first end portion 130 toward second end portion 131 to act as a lead-in. Similarly, second elastic averaging member 126 extends from a first end portion 139 to a second end portion 140 through an intermediate portion 141. Second end portion 131 includes a distal section 143. Second elastic averaging member 126 extends substantially perpendicularly from base portion 122 and is spaced from, and generally parallel to, first elastic averaging member 124. Second elastic averaging member 126 includes a first or exterior surface 144 and a second or interior surface 145. Exterior surface 144 includes a first rib 147 and a second rib 148. Ribs 147 and 148 taper inwardly from first end portion 139 toward second end portion 140 to act as a lead-in. The lead-ins provided by the first and second ribs 136, 147 and 137, 148 facilitate insertion of elastic averaging alignment member 120 into an alignment member receiver 165.

In accordance with the exemplary aspect shown, an elastic averaging element 153, shown in the form of a web 154, extends between interior surface 135 of first elastic averaging member 124 and interior surface 145 of second elastic averaging member 126. Web 154 includes a first end 155 and a second end 156. As discussed above, first end 155 is illustrated as being joined with base portion 122. However, it should be understood that first end 155 may also be spaced from base portion 122. A retaining clip 160 is positioned upon web 154.

The retaining clip 160 includes a clip member 163 and a spring member 1600 configured and disposed to engage with a portion 1601 of the alignment member receiver 165. The portion 1601 of the alignment member receiver 165 includes a tab 166 and a flange 167, which interferes with the tab 166 to thereby establish retention capability for elastic averaging alignment member 120.

Figure 8:
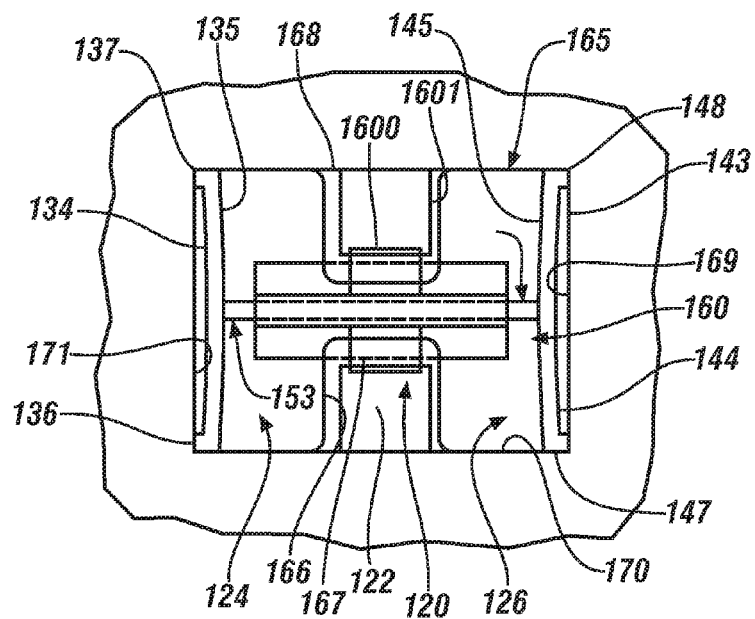
FIG. 8 is a plan view of the elastic averaging alignment member of FIG. 7 passing into the alignment member receiver.
Figure 9:
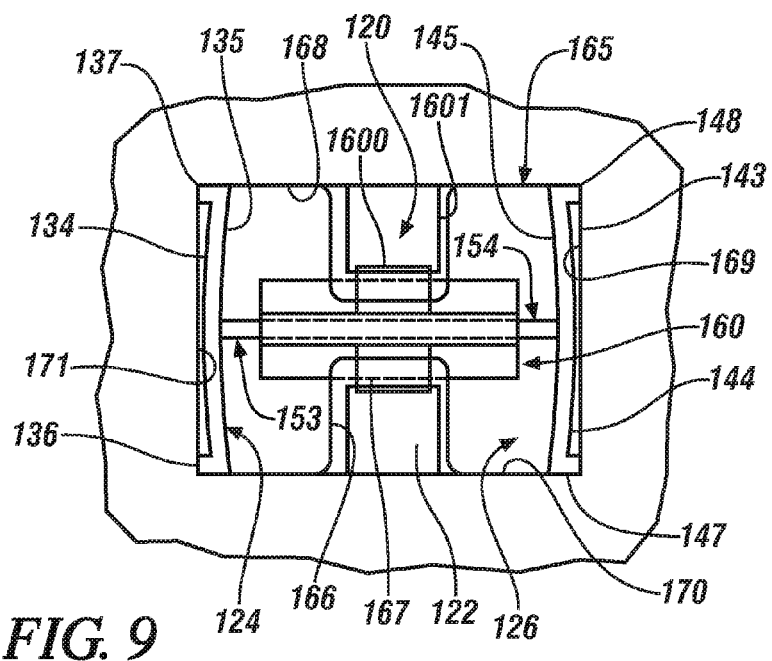
FIG. 9 is a plan view of the elastic averaging alignment member of FIG. 8 seated within the alignment member receiver.

As shown in FIG. 7, lead-ins provided by the first and second ribs 136, 147 and 137, 148 (see FIG. 6) facilitate insertion of elastic averaging alignment member 120 into the alignment member receiver 165, which is defined by a plurality of walls 168-171. As elastic averaging alignment member 120 is passed into alignment member receiver 165, ribs 136 and 137 engage with wall 171 and ribs 147 and 148 engage with wall 169 as shown in FIG. 8. As elastic averaging alignment member 120 continues to pass into alignment member receiver 165, ribs 135, 136 and 147, 148 cause first and second elastic averaging members 124 and 126 to deflect or bend around element 153 as shown in FIG. 9. The bending of first and second elastic averaging members 124 and 126 facilitates an elastically averaged alignment of components. The interference between the tab 166 and the flange 167 establish a mechanical stop for any attempt at continued insertion beyond the point of contact between the tab 166 and the flange 167. In addition, the spring member 1600 engages with the portion 1601 of the alignment member receiver 165 to establish retention capability.

Figure 10:
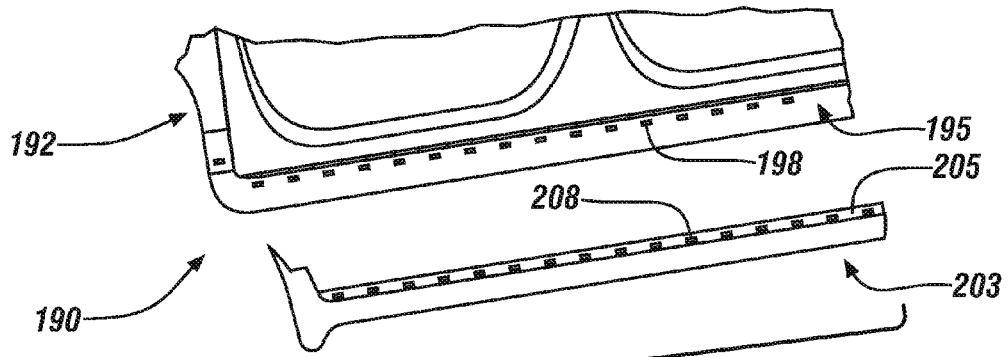
FIG. 10 is a partial perspective disassembled view of a motor vehicle and trim component including an elastic averaging alignment member in accordance with the exemplary embodiment.
Figure 11:
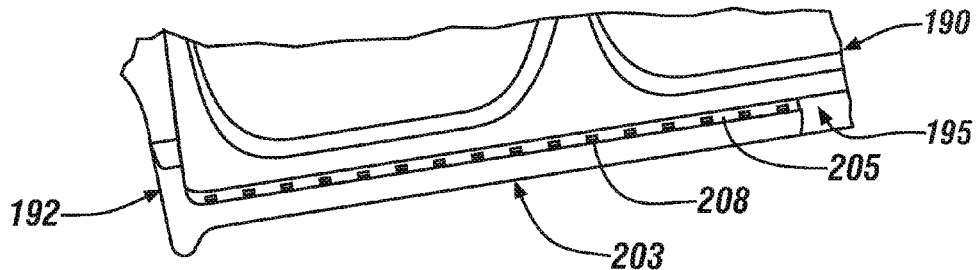
FIG. 11 is a partial perspective view of the motor vehicle of FIG. 8 illustrating the trim component joined to a trim component receiving portion through the elastic averaging alignment member in accordance with the exemplary embodiment.

Elastic averaging alignment members, as described above, may be employed in a wide range of configurations to facilitate a desired alignment of components to achieve a desired fit and finish. For example, as shown in FIGS. 10 and 11, a motor vehicle 190 includes a body 192 having a trim component receiving portion 195. Trim component receiving portion 195 is provided as a second component with a plurality of alignment member receivers, one of which is illustrated at 198. A trim component, such as shown at 203, is provided as a first component and includes a base portion 205 from which extend elastic averaging alignment members 208. Elastic averaging alignment members 208 are initially and roughly aligned with and then inter-engaged with alignment member receivers 198 to position and align trim component 203 to body 192 at trim component receiving portion 195. The use of elastic averaging alignment members allows for a much more desirable alignment then prior methods with manufactured clearances that established misalignments that would have previously resulted in a less than desirable fit and finish.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic averaging alignment member comprising:
   a base portion;
   a first elastic averaging member including a first end portion extending substantially perpendicularly from the base portion to a second end portion;
   a second elastic averaging member spaced from the first elastic averaging member, the second elastic averaging member including a first end section extending substantially perpendicularly from the base portion to a second end section; and
   at least one elastic averaging element arranged between the first and second elastic averaging members,
   wherein, when the elastic averaging alignment member is passed into an alignment member receiver to establish an elastically averaged position of one component to another component, at least one of the first and second elastic averaging members deforms toward the other of the first and second elastic averaging members and the at least one elastic averaging element deforms within a plane thereof.

2. The elastic averaging alignment member according to claim 1, wherein the at least one elastic averaging element defines a web extending between the first and second elastic averaging members, the web including a first end arranged at the base portion that extends to a second end.

3. The elastic averaging alignment member according to claim 2, further comprising a retaining clip operably disposed on the web.

4. The elastic averaging alignment member according to claim 2, wherein web is formed to define a plurality of openings.

5. The elastic averaging alignment member according to claim 4, wherein the plurality of openings extend between the first end and the second end of the web.

6. The elastic averaging alignment member according to claim 4, wherein each of the plurality of openings is substantially rectangular.

7. The elastic averaging alignment member according to claim 4, wherein each of the plurality of openings extends along the web through the second end to define at least one strain relief section and at least one V-shaped notch terminating at the strain relief section.

8. The elastic averaging alignment member according to claim 1, wherein the first elastic averaging member includes a first surface and an opposing second surface, the first surface including at least two ribs defining lead-ins facilitating insertion of the first and second elastic averaging alignment members into the alignment member receiver.

9. The elastic averaging alignment member according to claim 8, wherein each of the at least two ribs extends substantially perpendicularly from the first surface.

10. The elastic averaging alignment member according to claim 9, wherein each of the at least two ribs includes a first rib extending substantially perpendicularly from the first surface and a second rib extending substantially perpendicularly from the first surface and being spaced from the first rib.

11. A method of aligning a first substrate to a second substrate with elastic averaging alignment members, the method comprising:
   positioning the first substrate including a plurality of elastic averaging alignment members having at least two elastic averaging members joined by at least one elastic averaging element relative to the second substrate including a plurality of alignment member receivers;
   initially aligning the plurality of elastic averaging alignment members with respective ones of the plurality of alignment member receivers;
   inserting the at least two elastic averaging members into one of the alignment member receivers; and
   deforming at least one of the at least two elastic averaging members the other of the at least two elastic averaging members and the at least one elastic averaging element within a plane thereof to establish a desired final alignment of the first substrate relative to the second substrate.

12. The method of claim 11, wherein deforming at least one of the at least two elastic averaging members and the at least one elastic averaging element comprises compressing at least one of elastic averaging elements to close at least one of notches formed in a web extending between first and second elastic averaging members.

13. The method of claim 11, wherein deforming at least one of the at least two elastic averaging members and the at least one elastic averaging element comprises compressing a plurality of elastic averaging elements to close a plurality of openings having a generally rectangular cross-section formed in a web extending between first and second elastic averaging members.

14. The method of claim 11, wherein inserting the plurality of elastic averaging alignment members into one of the plurality of alignment member receivers includes bending the at least two elastic averaging members about the at least one elastic averaging element.

15. A motor vehicle comprising:
- a body having a trim component receiving portion provided with a plurality of alignment member receivers; and
- a trim component having a base portion provided with a plurality of elastically averaging alignment members; each of the plurality of elastic averaging alignment members comprising:
- a first elastic averaging member including a first end portion extending substantially perpendicularly from the base portion to a second end portion;
- a second elastic averaging member spaced from the first elastic averaging member, the second elastic averaging member including a first end portion extending substantially perpendicularly from the base portion to a second end portion; and
- at least one elastic averaging element arranged between the first and second elastic averaging members,
- wherein, when each of the plurality of alignment members are passed into corresponding ones of the plurality of alignment member receivers to establish an elastically average position of the trim component relative to the body, at least one of the first and second elastic averaging members deforms toward the other of the first and second elastic averaging members and the at least one elastic averaging element deforms within a plane thereof.

16. The motor vehicle according to claim 15, wherein the at least one elastic averaging element defines a web extending between the first and second elastic averaging members, the web including a first end coupled to the base portion that extends to a second end.

17. The motor vehicle according to claim 16, wherein the at least one elastic averaging element comprises a plurality of elastic averaging elements defined by a plurality of openings formed in the web, the plurality of openings extending between the first end and the second end of the web.

18. The motor vehicle according to claim 17, wherein the plurality of openings are substantially rectangular.

19. The motor vehicle according to claim 17, wherein the plurality of openings extend along the web through the second end to define a plurality of strain relief sections and a plurality of V-shaped notches terminating at the plurality of strain relief sections.

20. The motor vehicle according to claim 15, wherein the first elastic averaging member includes a first surface and an opposing second surface coupled to the at least one elastic averaging element, the first surface including a lead-in defining first rib extending substantially perpendicularly from a first end of the first surface and a lead-in defining second rib extending substantially perpendicularly from a second, opposing end of the first surface.

* * * * *